United States Patent Office.

WILLIAM CHASE BARNEY, OF BALTIMORE, MARYLAND.

TELEPHONIC INSTRUMENT.

SPECIFICATION forming part of Letters Patent No. 417,660, dated December 17, 1889.

Application filed April 13, 1889. Serial No. 307,379. (No model.)

*To all whom it may concern:*

Be it known that I, WILLIAM CHASE BARNEY, of the city of Baltimore, in the State of Maryland, have invented certain Improvements in Telephonic Instruments, of which the following is a specification.

In order that a tympan or diaphragm may respond with accuracy to vibrations caused by sound or by magnetic or any other force, it is necessary that it should not be subject to changes of temperature, moisture, or atmospheric conditions. After numerous experiments with various materials I have found that a tympan or diaphragm of thin sheets made of asbestus is almost entirely free from changes of temperature, and when secured at its edges and properly strained responds with the greatest accuracy to vibrations produced by air-waves or by magnetic or other forces. When a tympan or diaphragm of asbestus paper, parchment, or animal membrane is used in an instrument for transmitting electrical impulses by sound, for the purpose of reproducing articulate speech, I have found that the moisture of the breath tends to modify the tension of the tympan or diaphragm, and in order to insure the permanency of the tension of the tympan or diaphragm I coat the tympan or diaphragm with collodion, preferably with that kind of collodion known as "flexible" collodion.

I claim as my invention—

1. In an instrument for transmitting electrical impulses by sound, a diaphragm or tympan of thin sheets made of asbestus coated on one or both sides with collodion.

2. In an instrument for transmitting electrical impulses by sound, collodion as a varnish for the tympan or diaphragm.

3. In a magneto-telephone, a tympan or diaphragm coated with collodion.

WILLIAM CHASE BARNEY.

Witnesses:
 JAS. W. MCELROY,
 G. E. REARDON.